United States Patent
Foster et al.

(10) Patent No.: US 11,330,754 B2
(45) Date of Patent: May 17, 2022

(54) SYSTEMS AND METHODS FOR ASSESSING THE PERFORMANCE OF AN AGRICULTURAL IMPLEMENT

(71) Applicant: CNH Industrial America LLC, New Holland, PA (US)

(72) Inventors: Christopher A. Foster, Mohnton, PA (US); Trevor Stanhope, Palos Hills, IL (US); Christopher Barrick, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 260 days.

(21) Appl. No.: 16/668,192

(22) Filed: Oct. 30, 2019

(65) Prior Publication Data

US 2021/0127545 A1    May 6, 2021

(51) Int. Cl.
| | | |
|---|---|---|
| *A01B 63/00* | (2006.01) | |
| *A01B 35/32* | (2006.01) | |
| *A01B 79/00* | (2006.01) | |

(52) U.S. Cl.
CPC ............ *A01B 63/008* (2013.01); *A01B 35/32* (2013.01); *A01B 63/004* (2013.01); *A01B 79/005* (2013.01)

(58) Field of Classification Search
CPC ..... A01B 63/008; A01B 35/32; A01B 63/004; A01B 79/005; A01B 63/002; A01B 63/00; A01B 35/00; A01B 79/00
See application file for complete search history.

(56) References Cited

U.S. PATENT DOCUMENTS

| | | | |
|---|---|---|---|
| 8,827,001 | B2 | 9/2014 | Wendte et al. |
| 9,282,688 | B2 | 3/2016 | Casper et al. |
| 10,123,475 | B2 | 11/2018 | Posselius et al. |
| 2007/0125558 | A1 | 6/2007 | Embry |
| 2016/0029547 | A1 | 2/2016 | Casper et al. |
| 2017/0112043 | A1 | 4/2017 | Nair et al. |
| 2018/0206393 | A1 | 7/2018 | Stoller et al. |
| 2018/0310474 | A1 | 11/2018 | Posselius et al. |
| 2019/0380254 | A1 | 12/2019 | Viaene |
| 2021/0027449 | A1 | 1/2021 | Ferrari |
| 2021/0059094 | A1 | 3/2021 | Barrick |

OTHER PUBLICATIONS

The European Search Report Corresponding to Application No. 20204624.9 dated Mar. 26, 2021 (11 pages).

*Primary Examiner* — Christopher J. Novosad
(74) *Attorney, Agent, or Firm* — Rebecca L. Henkel; Rickard K. DeMille

(57) ABSTRACT

A system for assessing the performance of an agricultural implement may include a ground engaging tool configured to engage soil within a field as the agricultural implement is moved across the field such that the ground engaging tool creates a field material cloud aft of the ground engaging tool in a direction of travel of the agricultural implement. The system may further include a sensor configured to detect a cloud characteristic of the field material cloud and a controller communicatively coupled to the sensor. The controller may be configured to monitor data received from the sensor and assess the agricultural operation being performed based at least in part on the cloud characteristic.

16 Claims, 5 Drawing Sheets

SYSTEMS AND METHODS FOR ASSESSING THE PERFORMANCE OF AN AGRICULTURAL IMPLEMENT

FIELD OF THE INVENTION

The present disclosure relates generally to systems and methods for assessing the performance of agricultural implements during the execution of an agricultural operation with a field and, more particularly to systems for assessing the performance of an agricultural implement based at least in part on characteristics of a field material cloud created by the implement during the execution of an agricultural operation.

BACKGROUND OF THE INVENTION

It is well known that, to attain the best agricultural performance from a field, a farmer must cultivate the soil, typically through a tillage operation. Tillage implements typically include one or more ground engaging tools configured to engage the soil as the implement is moved across the field. Such ground engaging tool(s) loosen and/or otherwise agitate the soil to prepare the field for subsequent agricultural operations, such as planting operations. The field conditions or outputs resulting from a tillage operation, such as an average clod size, field levelness, and/or the like, impact subsequent farming operations within the field. Accordingly, the field conditions following the tillage operation may be monitored and used as an indicator of the overall performance or effectiveness of the tillage implement in executing the operation. Based on the performance of the tillage implement, one or more operating parameters of the tillage implement may be adjusted.

In this regard, sensor systems have been developed that attempt to directly detect field conditions, particularly average clod size, field levelness, etc., along a portion of the field behind the tillage implement during the tillage operation. However, it is typically quite difficult to directly determine field conditions using the conventional sensor systems due to clouds of field materials that are formed behind the implement, which may obscure the surface of the field.

Accordingly, improved systems and methods for assessing the performance of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for assessing the performance of an agricultural implement. The system includes a ground engaging tool configured to engage soil within a field as the agricultural implement is moved across the field such that the ground engaging tool creates a field material cloud aft of the ground engaging tool in a direction of travel of the agricultural implement. The system further includes a sensor configured to detect a cloud characteristic of the field material cloud. Additionally, the system includes a controller communicatively coupled to the sensor, with the controller being configured to monitor data received from the sensor and assess the agricultural operation being performed based at least in part on the cloud characteristic.

In an additional aspect, the present subject matter is directed to a method for assessing the performance of an agricultural implement within a field, the implement having a ground engaging tool configured to engage soil within the field as the agricultural implement is moved across the field. The method includes receiving, with a computing device, data indicative of a cloud characteristic of a field material cloud created aft of the ground engaging tool in a direction of travel of the implement during the performance of an agricultural operation. The method further includes comparing, with the computing device, the cloud characteristic to a predetermined characteristic range defined for the cloud characteristic. Additionally, the method includes, when the cloud characteristic falls outside the predetermined characteristic range, initiating, with the computing device, a control action to adjust the cloud characteristic of the field material cloud back within the predetermined characteristic range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
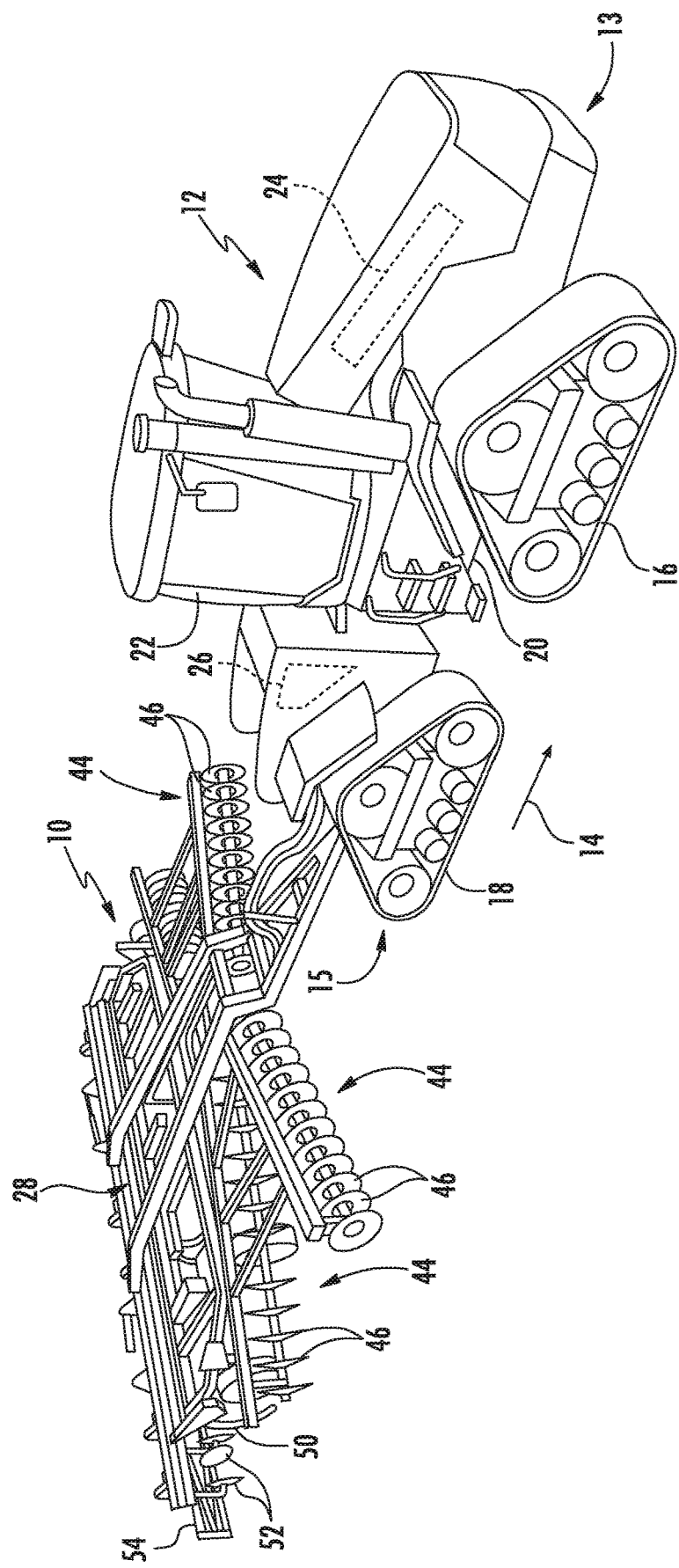
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for assessing the performance of an agricultural implement (e.g., a tillage implement) when executing an agricultural operation (e.g., a tillage operation). Specifically, in several embodiments, a computing device or controller of the disclosed system may be configured to monitor one or more field conditions or outputs of the agricultural operation based on data received from a sensor provided in operative association with an agricultural implement performing an operation within the field. The sensor may have a field of view directed towards a field material cloud (e.g., a rooster tail) formed aft of a ground engaging tool of the implement in a direction of travel of the implement as the ground engaging tool engages and moves across the field. The sensor generates data indicative of the monitored field condition(s) associated with the field. More particularly, in several embodiments, the sensor may generate data indicative of a cloud characteristic, such as an average particle size, a height, a width, and/or a density of the field material cloud, with the cloud characteristic of the field material cloud being indicative of field conditions or outputs, such as clod size, field levelness etc., of the agricultural operation being performed within the field.

Moreover, in accordance with aspects of the present subject matter, the system controller may be configured to assess whether the field conditions or outputs of the agricultural operation are acceptable based on a comparison of the detected cloud characteristic(s) to a predetermined range (s). For instance, the controller may determine that an associated field condition is outside an acceptable range when at least one detected cloud characteristic of the field material cloud created by the implement falls outside of its associated predetermined range. The controller may further determine the effectiveness of the agricultural implement performing the agricultural operation based on whether the detected cloud characteristics, and thus, whether the associated field conditions, are within acceptable ranges. Additionally, in some embodiments, the controller may be configured to adjust the operation of the implement and/or notify an operator of the effectiveness of the implement in performing the operation based on the detected cloud characteristics.

Figure 2:
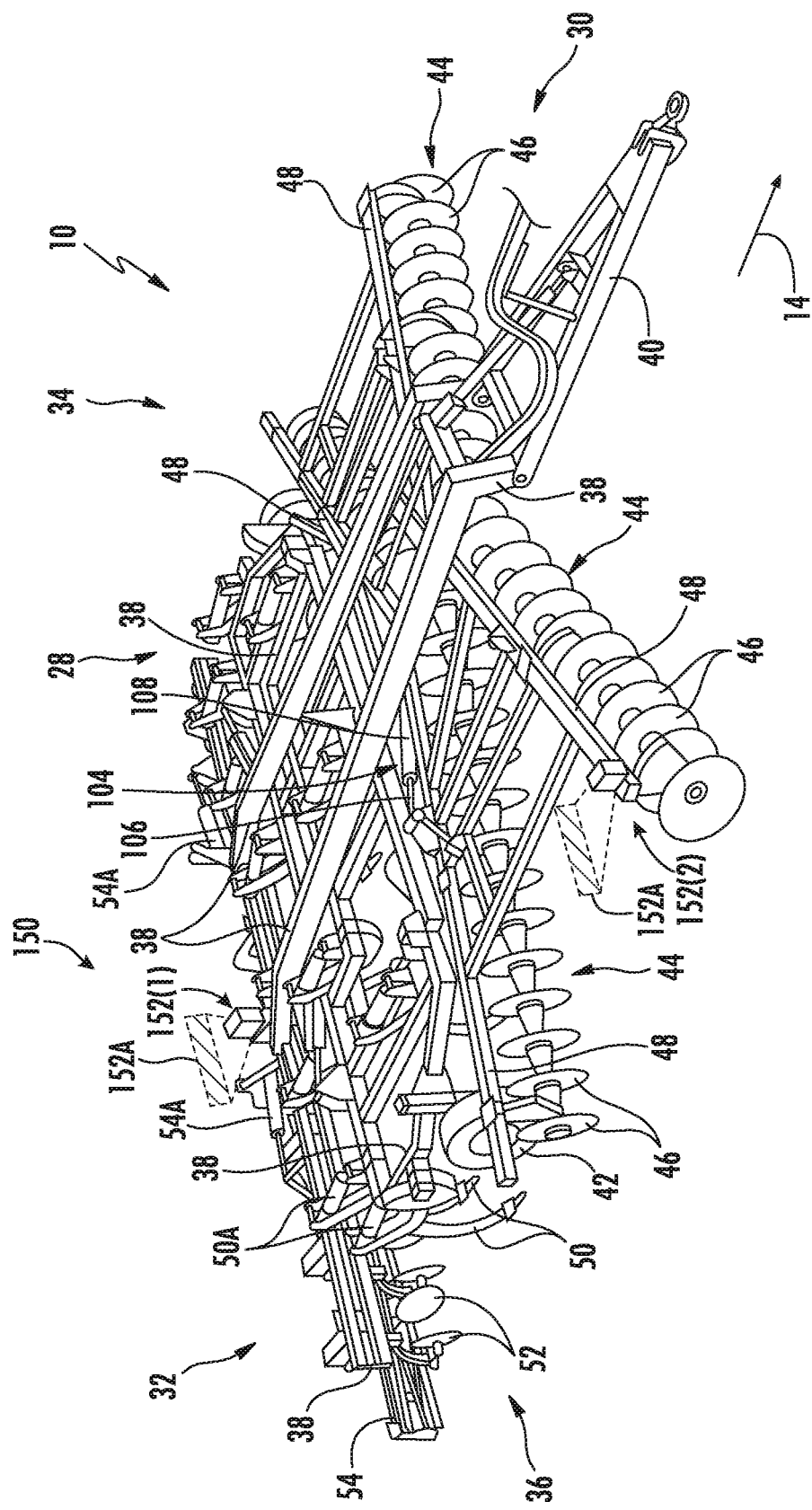
FIG. 2 illustrates another perspective view of the agricultural implement shown in FIG. 1, particularly illustrating an embodiment of a sensing assembly for monitoring field conditions supported relative to the implement in accordance with aspects of the present subject matter.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, and/or the like. Similarly, the work vehicle 12 may be configured as any other suitable type of vehicle, such as an agricultural harvester, and/or the like.

As shown in FIG. 1, the work vehicle 12 may include a pair of front track assemblies 16 (only one of which is shown) positioned at a front end 13 of the work vehicle 12, a pair of rear track assemblies 18 (only one of which is shown) positioned at a rear end 15 of the work vehicle 12, and a frame or chassis 20 coupled to and supported by the track assemblies 16, 18. An operator's cab 22 may be supported by a portion of the chassis 20 and may house various input devices (e.g., a user interface 60 shown in FIG. 7) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) via axles if multiple drive axles are employed).

As shown in FIGS. 1 and 2, the implement 10 may include a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (FIG. 2), with each actuator 104 being configured to move or otherwise adjust the orientation or position of one of the disk gangs 44 relative to the implement frame 28. For example, as shown in the illustrated embodiment, a first end of each actuator 104 (e.g., a rod 106 of the actuator 104) may be coupled to a support arm 48 of the corresponding disk gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk gang 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Further, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. The implement 10 may further include shank frame actuator(s) 50A and/or basket assembly actuator(s) 54A configured to move or otherwise adjust the orientation or position of the shanks 50 and the basket assemblies 54, respectively, relative to the implement frame 28. It should be appreciated that, in other embodiments, any other suitable ground-engaging tools may be coupled to and supported by the implement frame 28, such as a plurality closing disks.

Additionally, in accordance with aspects of the present subject matter, the implement 10 may be configured to support a sensing assembly 150, as shown in FIG. 2. The sensing assembly 150 may generally include one or more sensors 152 supported on the implement 10, with each sensor 152 having a field of view 152A directed towards the field. In particular, each sensor 152 may be supported relative to the implement 10 such that the field of view 152A of the sensor 152 is directed towards an aft portion of the field disposed generally rearward of the associated tool relative to the direction of travel 14. As shown in FIG. 2, in several embodiments, each sensor 152 may be supported on one of the frame members 38, 48 of the implement 10 described above. For example, in the embodiment shown, a first sensor 152(1) is positioned at or adjacent to the aft end 32 of the implement 10, such that a field of view 152A of the first sensor 152(1) is directed aft of the basket assemblies 54. As such, the first sensor 152(1) may be configured to generate data indicative of one or more field conditions associated with the aft portion of the field located behind or aft of the implement 10. However, the sensor(s) 152 may be positioned elsewhere on the implement such that the field of view 152A of the sensor(s) 152 is directed towards a portion of the field aft of any suitable portion of the implement 10. For instance, a second sensor 152(2) is positioned at or adjacent to one of the disk gangs 44 of the implement 10 such that the second sensor 152(2) may be configured to generate data indicative of one or more field conditions associated with the aft portion of the field located behind or aft of the associated disk gang 44.

Generally, the sensor(s) 152 may be configured to generate data indicative of field conditions within the aft portion of the field, such as clod sizes, field levelness, and/or the like. Particularly, as will be described in greater detail below, the sensor 152 may, in several embodiments, be configured to detect one or more cloud characteristics of a field material cloud, often referred to as a "rooster tail," formed by ground engaging tools of the implement 10, which may be indicative of the performance of the implement during the execution of an agricultural operation and, thus, the field conditions generated within the field as a result of the operation. Accordingly, the sensor(s) 152 may be supported relative to the implement 10 such that the field of view 152A of the sensors) 152 is directed towards such field material cloud(s). The sensor 152 may be configured as any suitable device, such as a camera(s) (including a stereo camera (s), and/or the like), LIDAR device(s), and/or the like) such that the sensor 152 generates image data, point-cloud data, and/or the like indicative of one or more characteristics of the field material cloud(s).

It should be appreciated that, while the sensing assembly 150 is shown as including only two sensors 152, the sensing assembly 150 may include any other suitable number of sensors 152, such as a single sensor 152 or three or more sensors 152. It should further be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
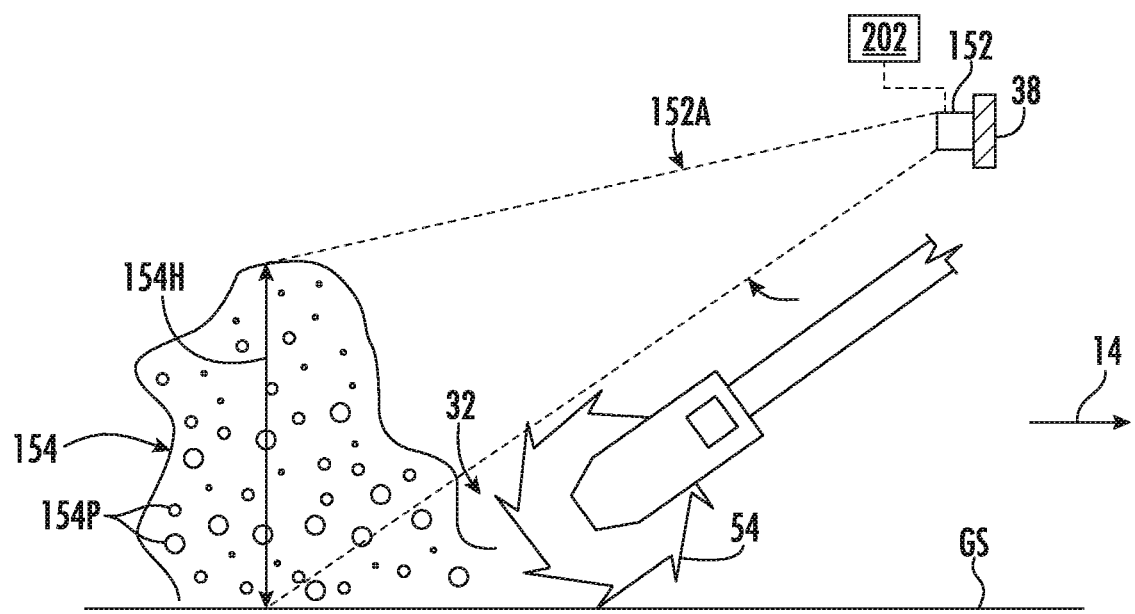
FIG. 3 illustrates a side view of an aft end of the implement and the sensing assembly shown in FIG. 2, particularly illustrating a field material cloud formed adjacent to the aft end of the implement in accordance with aspects of the present subject matter.
Figure 4:
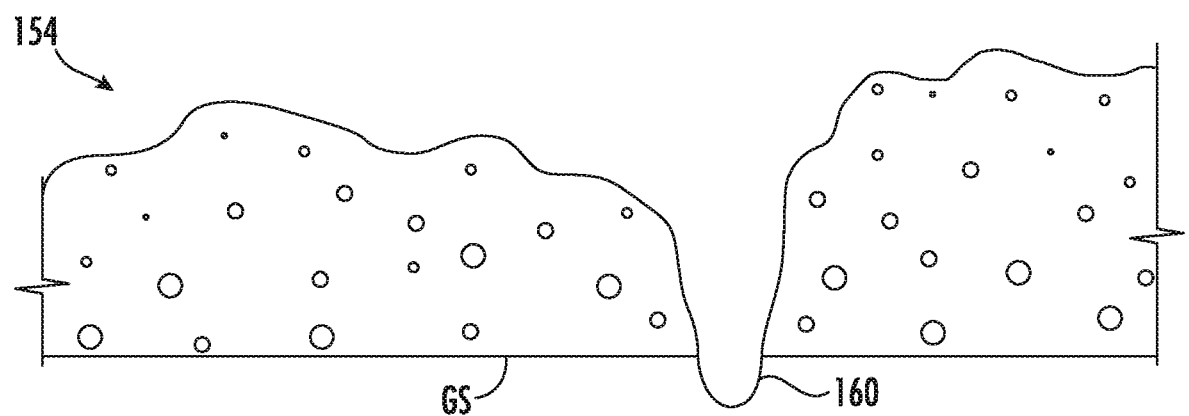
FIG. 4 illustrates a sectional view of a field material cloud formed adjacent to the aft end of the implement in accordance with aspects of the present subject matter.

Referring now to FIGS. 3 and 4, exemplary views of a field material cloud generated by the implement 10 shown in FIGS. 1 and 2 are illustrated in accordance with aspects of the present subject matter. Particularly, FIG. 3 shows a side view of the aft end 32 of the implement 10, particularly illustrating a field material cloud generated aft of the implement 10. Additionally, FIG. 4 illustrates a sectional view of a field material cloud generated aft of the implement 10.

As indicated above, when the ground engaging tools e.g., the basket assemblies 54 or disk gangs 44) engage a ground surface GS of the field, a cloud of field materials or a "rooster tail" 154 is created by the ground engaging tools, generally rearward or aft of such tools. In one embodiment, the sensor 152 is positioned relative to one of the basket assemblies 54 such that the field of view 152A of the sensor 152 is directed aft of the basket assembly 54 towards the field material cloud 154 created by the basket assembly 54. The sensor 152 may thus be able to detect characteristics of the field material cloud 154, such as the size of particles 154P within the field material cloud 154 and/or a height 154H of the field material cloud 154. Further, in some embodiments, the sensor 152 may be able to detect other characteristics of the field material cloud 154, such as a lateral width of the field material cloud 154, a density or distribution of the particles 154P within the field material cloud 154, and/or the like.

It has been determined that the characteristics of the field material cloud 154 may generally be indicative of the field conditions within the field following the execution of an agricultural operation, such as an average clod size of soil clods, field levelness, etc. For instance, with regard to average clod size, an average particle size of the particles 154P within the field material cloud 154 generally increases as the average clod size of clods within the field increases. In contrast, a height 154H of the field material cloud 154 generally increases as the clod size of clods within the field decreases. For example, as shown in FIG. 3, the size of the particles 154P generally decreases with increasing distance from the ground surface GS, as smaller particles 154P may be thrown by the basket assembly 54 further than larger particles 154P, which leads to taller field material cloud heights 154H. Similarly, when an average density of the field material cloud 154 increases, the clod size generally decreases.

With regard to field levelness, when the height 154H of the field material cloud 154 varies significantly across the lateral width of the implement 10 the field may be unlevel. Similarly, if a width of the field material cloud 154 significantly changes or does not extend across an entire width of the implement 10, the field may be unlevel due to localized mounds or trenches formed by the implement 10. For example, with reference to FIG. 4, a trench 160 is formed in the around surface GS such that a gap or break is formed within the field material cloud 154 along its width corresponding to the width of the trench 160.

The field conditions estimated using characteristics of the field material cloud 154 may be used as an indicator of the overall effectiveness of the implement 10 when executing an operation (e.g., a tillage operation) within the field. For instance, if the resulting soil clods within the fields are too large, the implement 10 is not set aggressive enough to sufficiently break-up the clods. Similarly, if the resulting soil clods within the field are too small, the implement 10 may be set too aggressively. Further, if the field is unlevel, the implement 10 is most likely unlevel.

Figure 5:
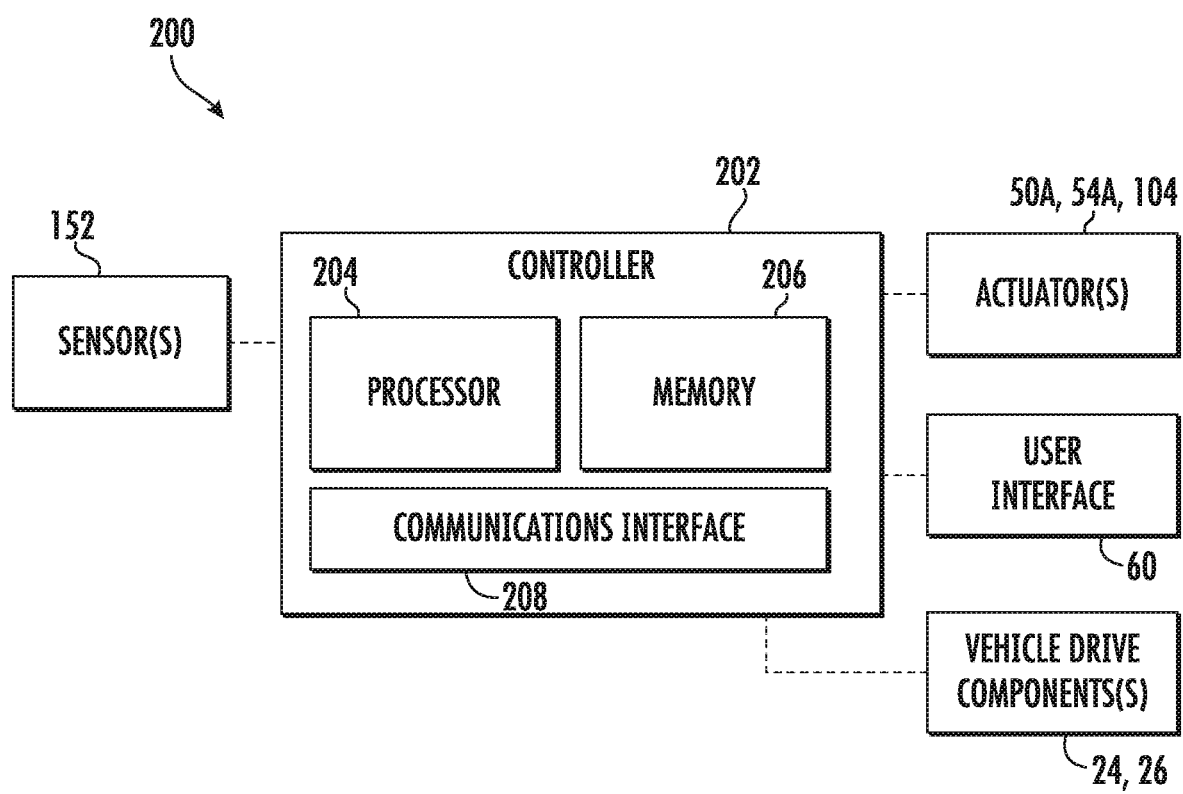
FIG. 5 illustrates a schematic view of a system for assessing the performance of an agricultural operation in accordance with aspects of the present subject matter.

Referring now to FIG. 5, a schematic view of a system 200 for monitoring field conditions as an agricultural implement is moved across a field is illustrated in accordance with aspects of the present subject matter. In general, the system 200 will be described herein with reference to the implement 10 and the work vehicle 12 described above with reference to FIGS. 1-2, as well as the sensing assembly 150 described above with reference to FIGS. 2-4. However, it should be appreciated by those of ordinary skill in the art that the disclosed system 200 may generally be utilized with work vehicles having any suitable vehicle configuration, implements having any suitable implement configuration, and/or with sensing assemblies having any other suitable assembly configuration. Additionally, it should be appreciated that, for purposes of illustration, communicative links or electrical couplings of the system 200 shown in FIG. 5 are indicated by dashed lines.

As shown in FIG. 5, the system 200 may include a controller 202 configured to electronically control the operation of one or more components of the agricultural implement 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory PAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 and/or the associated work vehicle to allow for the disclosed system and method to be implemented without requiring additional software to be uploaded onto existing control devices of the implement/vehicle.

In some embodiments, the controller 202 may include a communications module or interface 208 to allow for the controller 202 to communicate with any of the various other system components described herein. For instance, in several embodiments, the controller 202 may be configured to receive data from one or more sensors of the agricultural implement 10 that are used to monitor the characteristics of the field material cloud(s) 154 formed aft of the implement 10, such as one or more of the sensors 152 described above with reference to FIGS. 2-4. The controller 202 may be communicatively coupled to the sensor(s) 152 via any suitable connection, such as a wired or wireless connection, to allow data indicative of the characteristic(s) of the field material cloud(s) 154 to be transmitted from the sensor(s) 152 to the controller 202.

Specifically, referring back to FIGS. 2-4, each sensing assembly 150 may, for example, include or be associated with one or more sensors 152 installed or otherwise positioned relative to one or more of the ground engaging tools of the implement 10 to collect data indicative of a characteristic of a field material cloud 154 formed aft of the respective ground engaging tools. Particularly, the sensors 152 may be configured to collect size data, height data, width data, density data, etc. indicative of particle sizes, a height 154H, a width, a density, etc. of the field material cloud 154. The characteristics of the field material cloud 154 may be used to infer or estimate a field characteristic, such as an average clod size within the field and/or a field levelness, which may in turn be used as an indicator of the overall performance of the implement 10 within the field. Thus, in several embodiments, the controller 202 may be configured to determine the effectiveness of the implement 10 or, more particularly, the performance of current settings of the implement 10, based at least in part on the data received from the sensor(s) 152. For example, the controller 202 may include one or more suitable algorithms stored within its memory 206 that, when executed by the processor 204, allow the controller 202 to infer or estimate an average clod size within the field and/or the field levelness, and thus an effectiveness of the tillage implement in executing the associated operation, based at least in part on the data received from the sensor(s) 152.

For instance, the controller 202 may include one or more algorithms that compare the cloud characteristic(s) (e.g., the average particle size, average cloud height 154H, cloud width, cloud density, etc.) estimated based on the data received from the sensor(s) 152 to one or more predetermined ranges associated with the an acceptable or desired field condition. For example, the controller 202 may compare the average particle size within the field material cloud 154 to a predetermined particle size range, the height 154lH of the field material cloud 154 to a predetermined height range or a predetermined height gradient range, the width of the field material cloud 154 to a predetermined width range, and/or the density of the field material cloud 154 to a predetermined density range. Each predetermined cloud characteristic range(s) may correspond to a range of values (e.g., a range of average particle sizes or a range of cloud heights) across which the associated field conditions or output parameters of the implement should be is acceptable. For example, each range may be bound by upper and lower end values between which the associated field condition or output parameter should be acceptable based on a predetermined relationship defined between the specific cloud characteristic and the field condition or output parameter. In one embodiment, the ranges may be selected from ranges that are predetermined and stored in the memory 206 of the controller 202. In some embodiments, the ranges may be selected based at least in part on a current ground speed of the implement 10. For instance, the height 154H of the field material cloud 154 may be expected to increase with an increase in the speed of the implement 10. In some embodiments, the predetermined range(s) may also be selected based at least in part on a desired clod size or other field condition requested or input by a user, e.g., via the user interface 60. Additionally, in some embodiments, the predetermined range(s) may be selected based at least in part on a moisture content of the soil and/or a soil type.

It should be appreciated that, in some embodiments, only one of the characteristics (particle size, the height 154H, width, density, etc.) of the field material cloud 154 is evaluated to estimate the field condition(s). However, in other embodiments, multiple cloud characteristics of the field material cloud 154 may be evaluated to estimate the field condition(s) with higher certainty. For instance, in one embodiment, both the particle size and the height 154H of the field material cloud 154 may be evaluated to estimate the average clod size of the soil clods resulting from an agricultural operation with higher certainty.

By continuously monitoring the cloud characteristic(s) of the field material cloud being generated by ground engaging tool(s) and comparing such detected characteristic(s) to its predetermined characteristic range(s), the controller 202 may estimate or inter when the associated field condition or output parameter similarly falls outside an acceptable or desired range. For instance, with regard to soil clod size, when the average particle size within the field material cloud 154 exceeds an upper end of the predetermined particle size range and/or when the height 154H of the field material cloud 154 falls below a lower end of the predetermined height range, the controller 202 may, for example, estimate or infer that the average clod size within the field is too large, and, thus, that the current performance of the implement is likely not acceptable. Similarly, when the average particle size within the field material cloud 154 falls below a lower end of the predetermined particle size range, when the height 154H of the field material cloud 154 exceeds an upper end of the predetermined height range, and/or when the density of the field material cloud 154 exceeds an upper end of the predetermined density range, the controller 202 may infer that the average clod size within the field is too small, and, thus, that the current performance of the implement is likely not acceptable.

Similarly, regarding field levelness, when the width of the field material cloud 154 falls below a lower end of the predetermined width range and/or when the gradient of the height 154H of the field material cloud 154 across the width of the implement 10 exceeds a predetermined gradient range, the controller 202 may infer that the field is unlevel, and, thus, that the current performance of the implement is likely not acceptable.

In several embodiments, the controller 202 may further be configured to perform one or more implement-related control actions based on the data received from the sensor(s) 152. Specifically, the controller 202 may be configured to control one or more components of the agricultural implement 10 based on the inference that the field conditions are not acceptable. More particularly, the controller 202 may be configured to control one or more components of the agricultural implement 10 to adjust the aggressiveness of the implement 10 when the inferred or estimated average clod size is too large or too small and/or to adjust the levelness of the implement 10 when it is estimated or inferred that the implement is not level. For example, as shown in FIG. 5, the controller 202 may be configured to control the basket assembly actuator(s) 54A associated with the baskets 54 to adjust an aggressiveness of the baskets 54 in breaking up or removing clods within the field and/or adjust a levelness of the implement 10. Further, the controller 202 may be configured to control the disk gang actuators) 104 associated with the disk gang 44. For instance, the controller 202 may be configured to control the down force on the disk gang 44 to adjust a penetration depth of the disk blades 46 of the disk gang 44 and/or a levelness of the implement 10. The controller 202 may similarly be configured to control the shank frame actuator(s) 50A associated with the shanks 50 to adjust a penetration depth of the shanks 50 and/or a levelness of the implement 10.

Further, in some embodiments, the controller 202 may be configured to indicate to an operator the current field condition and/or one or more parameters associated with the current field condition. For example, in the embodiment shown in FIG. 5, the communications module 258 may allow the controller 202 to communicate with a user interface 60 having a display device configured to display information regarding the field condition (e.g., the average clod size, the field levelness, etc.). However, it should be appreciated that the controller 202 may instead be communicatively coupled to any number of other indicators, such as lights, alarms, and/or the like to provide an indicator to the operator regarding the field condition.

Additionally or alternatively, in some embodiments, the controller 202 may be configured to perform one or more vehicle-related control actions based on the estimation of unacceptable field conditions (e.g., unacceptable clod sizes and/or field levelness). For example, as shown in FIG. 5, in some embodiments, the controller 202 may be configured to control the operation of one or more vehicle drive components configured to drive the vehicle 12 coupled to the implement 10, such as the engine 24 and/or the transmission 26 of the vehicle 12. In such embodiments, the controller 202 may be configured to control the operation of the vehicle drive component(s) 24, 26 based on the estimated field conditions, for example, to slow down the vehicle and implement 10 or bring the vehicle and implement 10 to a stop when it is estimated that the field conditions are unacceptable.

It should be appreciated that, depending on the type of controller 202 being used, the above-described control actions may be executed directly by the controller 202 or indirectly via communications with a separate controller. For instance, when the controller 202 corresponds to an implement controller of the implement 10, the controller 202 may be configured to execute the implement-related control actions directly while being configured to execute the vehicle-related control actions by transmitting suitable instructions or requests to a vehicle-based controller of the vehicle 12 towing the implement 10 (e.g., using an ISObus communications protocol). Similarly, when the controller 202 corresponds to a vehicle controller of the vehicle towing the implement 10, the controller 202 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

Figure 6:
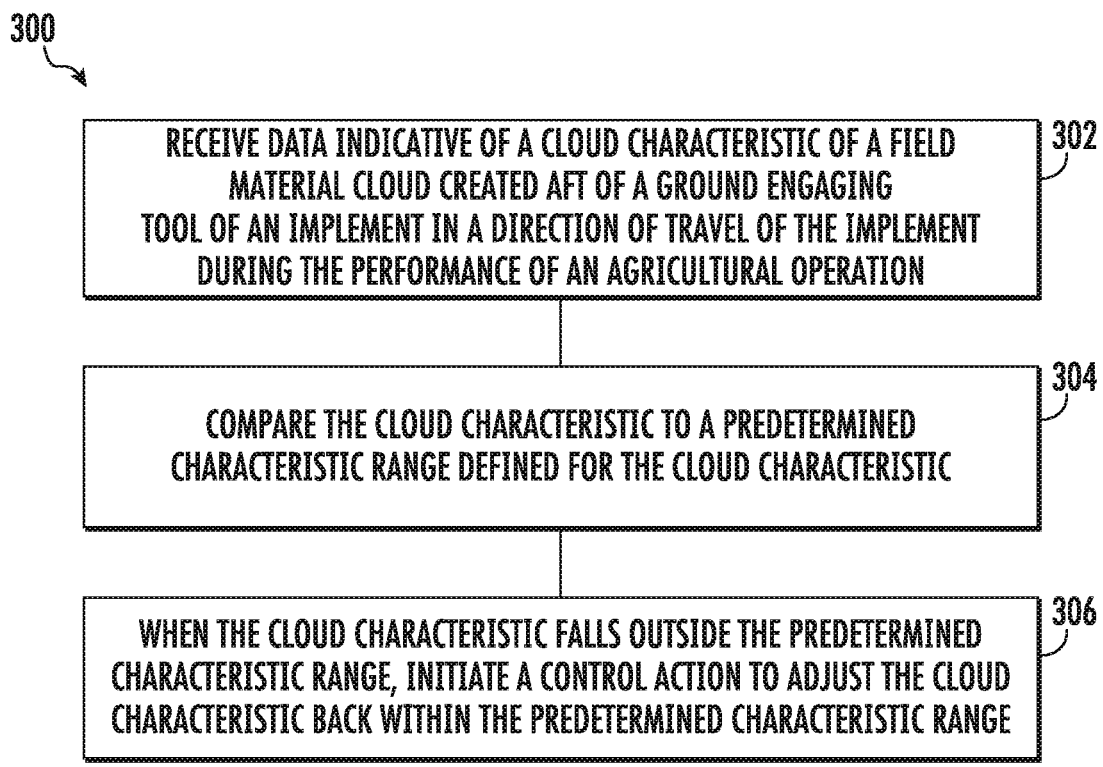
FIG. 6 illustrates a flow diagram of one embodiment of a method for assessing the performance of an agricultural operation in accordance with aspects of the present subject matter.

Referring now to FIG. 6, a flow diagram of one embodiment of a method 300 for monitoring field conditions as an agricultural operation is performed within a field is illustrated in accordance with aspects of the present subject matter. In general, the method 300 will be described herein with reference to the implement 10 and the work vehicle 12 shown in FIGS. 1-2, as well as the sensing assembly 150 shown in FIGS. 2-4 and the various system components shown in FIG. 5. However, it should be appreciated that the disclosed method 300 may be implemented with work vehicles and/or implements having any other suitable configurations, with sensing assemblies having any other suitable configurations, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include receiving data indicative of a cloud characteristic of a field material cloud created aft of a ground engaging tool of an implement in a direction of travel of the implement during the performance of an agricultural operation. For instance, as indicated above, the controller 202 may be configured to receive input(s) from one or more sensors configured to provide an indication of characteristics of a field material cloud 154 formed aft of the implement 10, such as by receiving data indicative of a particle size, height, width, density, and/or the like from one or more sensors 152 provided in operative association with the implement 10.

Further, at (304), the method 300 may include comparing the cloud characteristic to a predetermined characteristic range defined for the cloud characteristic. As described above, for example, the controller 202 may compare the characteristic(s) of the field material cloud 154 to an associated predetermined characteristic range(s) to determine when the characteristic(s) are outside of a desired range.

Additionally, at (306), the method 300 may include, when the cloud characteristic falls outside the predetermined characteristic range, initiating a control action to adjust the cloud characteristic of the field material cloud back within the predetermined characteristic range. For instance, as described above, the controller 202 may initiate a control action when the detected characteristic of the field material cloud 154 falls outside the predetermined characteristic range. For example, the controller 202 may adjust an operation of the implement and/or generate a notification for an operator of the implement indicative of the effectiveness of the agricultural implement performing the agricultural operation based at least in part on the cloud characteristic.

It is to be understood that, in several embodiments, the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 202 described herein, such as the method 300, are implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for assessing the performance of an agricultural implement, the system comprising:
    a ground engaging tool configured to engage soil within a field as the agricultural implement is moved across the field such that the ground engaging tool creates a field material cloud aft of the ground engaging tool in a direction of travel of the agricultural implement;
    a sensor configured to detect a cloud characteristic of the field material cloud; and
    a controller communicatively coupled to the sensor, the controller being configured to monitor data received from the sensor and assess the agricultural operation being performed based at least in part on the cloud characteristic; wherein the cloud characteristic corresponds to at least one of particle sizes of particles within the field material cloud, a cloud height of the field material cloud, or a cloud width of the field material cloud and wherein the controller is configured to compare an average particle size of the particles within the field material cloud to a predetermined particle size range, the predetermined particle size range being associated with a desired field condition of the agricultural operation.

2. The system of claim 1, wherein the controller is configured to compare the cloud height of the field material cloud to a predetermined height range, the predetermined height range being associated with a desired field condition of the agricultural operation.

3. The system of claim 1, wherein the controller is configured to compare the cloud width of the field material cloud to a predetermined width range, the predetermined width range being associated with a desired field condition of the agricultural operation.

4. The system of claim 1, wherein the controller is configured to estimate at least one of an average clod size of soil clods or a field levelness resulting from the agricultural operation based at least in part on the cloud characteristic.

5. The system of claim 1, wherein the controller is further configured to initiate a control action when the cloud characteristic falls outside a predetermined characteristic range defined for the cloud characteristic.

6. The system of claim 5, wherein the control action comprises adjusting an operating parameter associated with the agricultural implement.

7. The system of claim 6, wherein adjusting the operating parameter associated with the agricultural implement comprises adjusting a downforce on the ground engaging tool.

8. The system of claim 5, wherein the control action comprises generating a notification for an operator of the agricultural implement indicative of an effectiveness of the agricultural operation.

9. The system of claim 1, wherein the sensor comprises at least one of a radar sensor, a camera, or a LIDAR device.

10. A method for assessing the performance of an agricultural implement within a field, the implement comprising a ground engaging tool configured to engage soil within the field as the agricultural implement is moved across the field, the method comprising:
 receiving, with a computing device, data indicative of a cloud characteristic of a field material cloud created aft of the ground engaging tool in a direction of travel of the implement during the performance of an agricultural operation;
 comparing, with the computing device, the cloud characteristic to a predetermined characteristic range defined for the cloud characteristic; and
 when the cloud characteristic falls outside the predetermined characteristic range, initiating, with the computing device, a control action to adjust the cloud characteristic of the field material cloud back within the predetermined characteristic range;
 wherein the cloud characteristic corresponds to at least one of particle sizes of particles within the field material cloud, a cloud height of the field material cloud, or a cloud width of the field material cloud and wherein comparing the cloud characteristic to a predetermined characteristic range comprises comparing an average particle size of the particle sizes of the particles within the field material cloud to a particle size range, the particle size range being associated with a desired field condition of the agricultural operation.

11. The method of claim 10, wherein comparing the cloud characteristic to a predetermined characteristic range comprises comparing the cloud height of the field material cloud to a predetermined height range, the height range being associated with a desired field condition of the agricultural operation.

12. The method of claim 10, wherein comparing the cloud characteristic to a predetermined characteristic range comprises comparing the cloud width of the field material cloud to a predetermined width range, the width range being associated with a desired field condition of the agricultural operation.

13. The method of claim 10, wherein the cloud characteristic is indicative of a field condition associated with the agricultural operation, the field condition comprising an average clod size of soil clods or a field levelness resulting from the agricultural operation, wherein initiating the control action comprises initiating the control action to adjust the field condition associated with the agricultural operation.

14. The method of claim 10, wherein the control action comprises adjusting an operating parameter of the agricultural implement.

15. The method of claim 14, wherein adjusting the operating parameter of the agricultural implement comprises adjusting a downforce on the ground engaging tool.

16. The method of claim 10, wherein the control action comprises generating a notification for an operator of the agricultural implement indicative of an effectiveness of the agricultural operation.

* * * * *